United States Patent [19]
Seki et al.

[11] Patent Number: 5,467,445
[45] Date of Patent: Nov. 14, 1995

[54] CROSS SECTIONAL CONFIGURATION CREATING APPARATUS IN THE CREATION OF FREE CURVE

[75] Inventors: Masaki Seki, Suginami; Osamu Hanaoka, Minamitsuru, both of Japan

[73] Assignee: Fanuc Ltd., Yamanashi, Japan

[21] Appl. No.: 157,041

[22] PCT Filed: Apr. 7, 1993

[86] PCT No.: PCT/JP93/00449

§ 371 Date: Dec. 2, 1993

§ 102(e) Date: Dec. 2, 1993

[87] PCT Pub. No.: WO93/21569

PCT Pub. Date: Oct. 28, 1993

[30] Foreign Application Priority Data

Apr. 7, 1993 [JP] Japan ....................................... 4-94233

[51] Int. Cl.⁶ .................................................... G06F 15/60
[52] U.S. Cl. ............................................................ 395/142
[58] Field of Search ..................................... 395/142, 143, 395/141, 140; 345/113, 114, 118

[56] References Cited

U.S. PATENT DOCUMENTS 5,065,348  11/1991  Kuragano et al. ....................... 364/119

FOREIGN PATENT DOCUMENTS

| 0148279 | 7/1985 | European Pat. Off. . |
| 0151187 | 8/1985 | European Pat. Off. . |
| 3608438 | 9/1986 | Germany . |
| 61-148505 | 7/1986 | Japan . |
| 1-116884 | 5/1989 | Japan . |
| 1-306971 | 12/1989 | Japan . |
| 4-114205 | 4/1992 | Japan . |

*Primary Examiner*—Phu K. Nguyen
*Attorney, Agent, or Firm*—Staas & Halsey

[57] ABSTRACT

A cross sectional configuration creating apparatus to create a free curve by which a cross sectional configuration can be easily defined. An operator creates a cross sectional configuration (DC) on a predetermined plane coordinate system by using a cross sectional configuration creation device. When the creation of a free curve is commanded, a coordinate transformation device positions the created cross sectional configuration (DC) on a plane designated in a spatial coordinate system. Then, a free curve creation device creates the free curve from the cross sectional configuration (DC) positioned on the plane designated in the spatial coordinate system and a basic curve (BC). Further, if necessary, an inverse coordinate transformation device returns the cross sectional configuration (DC) positioned on the plane designated in the spatial coordinate system to the plane coordinate system in response to a command from the operator. The operator can correct the cross sectional configuration (DC) by using the cross sectional configuration creation device.

7 Claims, 15 Drawing Sheets

CROSS SECTIONAL CONFIGURATION CREATING APPARATUS IN THE CREATION OF FREE CURVE

BACKGROUND OF THE INVENTION

1. Field of the Invention

The present invention relates to a cross sectional configuration creating apparatus in the creation of a free curve, and more specifically, to a cross sectional configuration creating apparatus in the creation of a free curve for creating a cross sectional configuration for creating a free curve by a CAD/CAM system.

2. Description of the Related Art

This application was filed on PCT international application No. PCT/JP93/00449 on Apr. 7, 1993.

A free curve of a metal mold and the like is composed of a basic curve (BC) as an arbitrary curve and a drive curve (DC) in a spatial coordinate system. More specifically, the free curve is created by moving the drive curve along the basic curve in accordance with a predetermined rule. Therefore, when the free curve is created, the drive curve must be defined with respect to the passing-through points of the basic curve. The drive curve is referred to as a "cross sectional configuration" and usually defined on a plane coordinated system.

FIG. 14 is a diagram showing the relationship between the basic curve and the drive curve, wherein a basic curve BC is defined on a spatial coordinate system (X, Y, Z). A cross sectional configuration DC141 is defined at the passing-through point P141 of the basic curve BC as the drive curve. In the same way, a cross sectional configuration DC142 is defined at a passing-through point P142. These cross sectional configurations DC141, DC142 are curves defined on respective plane coordinate systems 141, 142 each having a V axis as the ordinate and an H axis as the abscissa.

Conventionally, there are known four methods of defining a cross sectional configuration with respect to a basic curve, i.e., a "parallel method", "radiation method", "normal method" and "vertical method" which will be described below.

FIGS. 15(a)–15(d) are diagrams of methods of defining a cross sectional configuration with respect to a basic curve.

First, a method of defining the cross sectional configuration by the "parallel method" will be described by using FIG. 15(a). A cross sectional configuration DC151 is predefined. Then, an operator designates the angles, passing-through points and the like of defined plane coordinate systems in a spatial coordinate system. With this arrangement, plane coordinate systems 151a, 152a, 153a are positioned at the angles designated at the passing-through points on a basic curve BC151. Therefore, a free curve is created from the basic curve BC151 and the cross sectional configuration DC151 on the plane coordinate systems 151a, 152a, 153a.

Further, a method of defining the cross sectional configuration by the "radiation method" will be described by using FIG. 15(b). A cross sectional configuration DC152 is predefined. In addition, a point P152 is designated which serves as the center in a spatial coordinate system. The point P152 is positioned on the radiation having the ordinate (V axis) as a central axis so that the point P152 acts as the origin of, for example, plane coordinate systems 151b, 152b, 153b. A free curve is created from the cross sectional configuration DC152 of the thus positioned plane coordinate systems 151b, 152b, 153b and a basic curve BC152.

Further, a method of defining the cross sectional configuration by the "normal method" will be described by using FIG. 15(c). A cross sectional configuration DC153 is predefined. Next, passing-through points on the basic curve BC153 in a spatial coordinate system are designated. Plane coordinate systems 151c, 152c, 153c are positioned so that the tangential vectors of the basic curve BC153 at the passing-through points become normal vectors. A free curve is created from the cross sectional configuration DC153 of the thus positioned plane coordinate systems 151c, 152c, 153c and the basic curve BC153.

Then, a method of defining the cross sectional configuration by the "vertical method" will be described by using FIG. 15(d). A cross sectional configuration DC154 is predefined. Further, a basic curve BC154a is defined on a plane coordinate system BS154a and a basic curve BC154b is defined on a plane coordinate system BS154b. Next, passing-through points are defined on the two basic curves BC154a and BC154b. Then, plane coordinate systems 151d, 152d, 153d are positioned so that one end point of the cross sectional configuration DC154 is at the passing-through point of the basic curve BC154a and the other end point thereof is at the passing-through point of the basic curve BC154b as well as the line segments passing through the respective passing-through points of the basic curve BC154a become the vertical lines of the plane coordinate system BS154b. A free curve is created from the cross sectional configuration DC154 of the thus positioned plane coordinate systems 151d, 152d, 153d and the basic curve BC154a.

Nevertheless, when the cross sectional configuration is defined, since it is defined on the plane to be positioned in the spatial coordinate system, other line segments such as, for example, basic curves and the like are displayed on a display unit, and thus a problem arises in that the cross sectional configuration is difficult to be defined.

SUMMARY OF THE INVENTION

Taking the above into consideration, an object of the present invention is to provide a cross sectional configuration creating apparatus in the creation of a free curve by which a cross sectional configuration can be easily defined.

To attain the above object, according to the present invention, there is provided a cross sectional configuration creating apparatus in the creation of a free curve for creating a cross sectional configuration to create the free curve by a CAD/CAM system, which comprises a cross sectional configuration creation means for creating the cross sectional configuration on a predetermined plane coordinate system, a coordinate transformation means for performing coordinate transformation of the cross sectional configuration created on the predetermined plane coordinate system to position the cross sectional configuration on the plane in a spatial coordinate system, a free curve creation means for creating the free curve from the cross sectional configuration positioned on the plane in the spatial coordinate system and a basic curve defined in the spatial coordinate system, and an inverse coordinate transformation means for performing inverse coordinate transformation of the cross sectional configuration positioned on the plane of the spatial coordinate system to return the cross sectional configuration to the plane coordinate system.

An operator creates the cross sectional configuration on the predetermined coordinate system by using the cross sectional configuration creation means. The thus created cross sectional configuration is positioned on the plane designated in the spatial coordinate system by the coordinate transformation means. Then, the free curve is created by the free curve creation means from the cross sectional configuration positioned on the plane designated in the spatial coordinate system and the basic curve.

If the created free curve does not satisfy the intention of the operator, the inverse coordinate transformation means returns the cross sectional configuration positioned on the plane designated in the spatial coordinate system to the plane coordinate system in response to a command from the operator. With this arrangement, the operator can correct the cross sectional configuration. Then, a free curve is created again by the coordinate transformation means and free curve creation means.

DETAILED DESCRIPTION OF THE PREFERRED EMBODIMENTS

An embodiment of the present invention will be described below with reference to the drawings.

Figure 1:
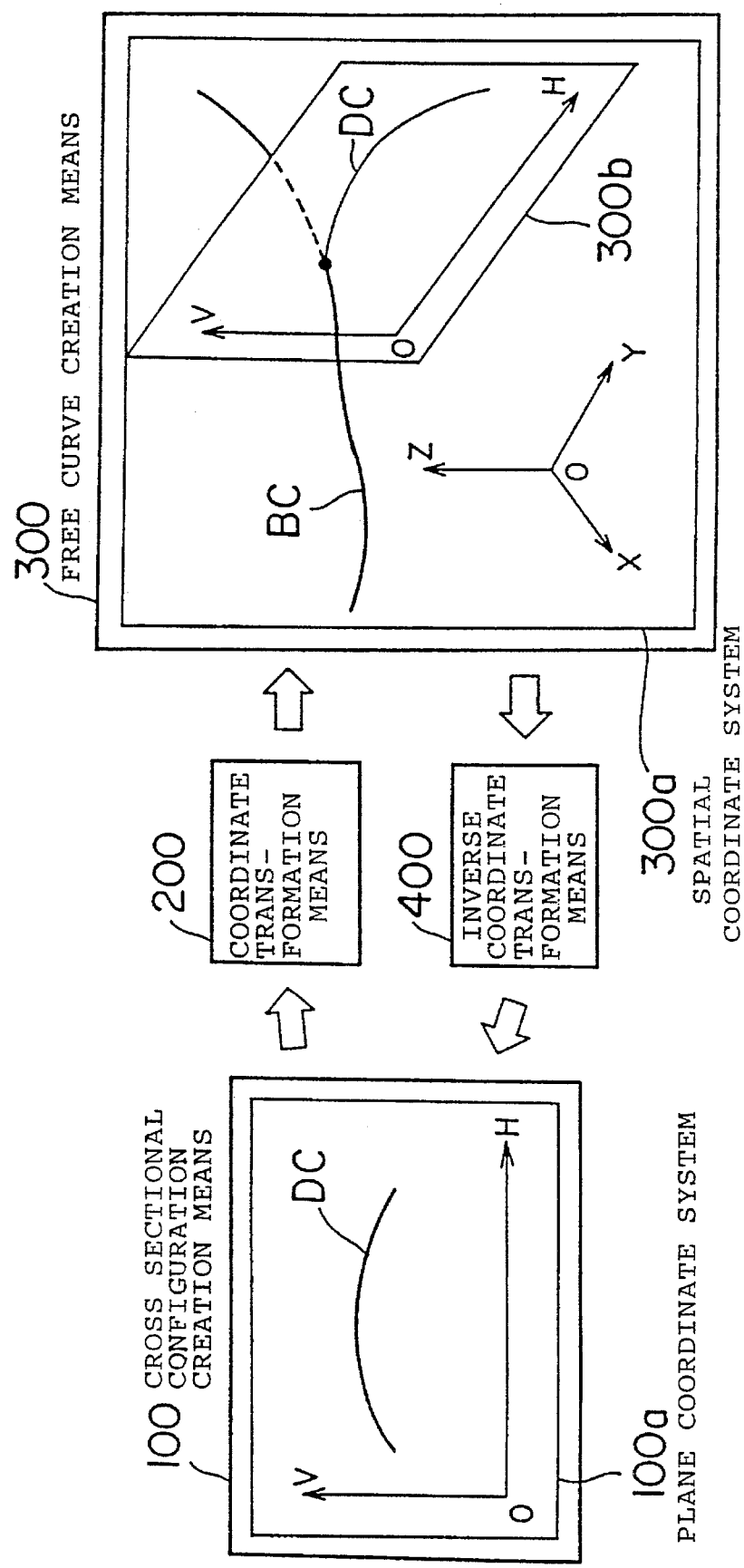
FIG. 1 is a diagram explaining the principle of a cross sectional configuration creating apparatus in the creation of a free curve according to the present invention.

FIG. 1 is a diagram explaining the principle of a cross sectional configuration creating apparatus in the creation of a free curve according to the present invention. In the figure, the cross sectional configuration creating apparatus comprises a cross sectional configuration creation means 100, coordinate transformation means 200, free curve creation means 300, and inverse coordinate transformation means 400.

The cross sectional configuration creation means 100 creates a cross sectional configuration DC on a predetermined plane coordinate system 100a in accordance with a figure or the like input by an operator. The coordinate transformation means 200 performs coordinate transformation of the cross sectional configuration DC created on the plane coordinate system 100a so that the configuration DC is positioned on the plane 300b designated in a spatial coordinate system 300a. The free curve creation means 300 creates a free curve from the cross sectional configuration DC positioned on the plane 300b designated in the spatial coordinate system 300a and a basic curve BC defined in the spatial coordinate system 300a. The inverse coordinate transformation means 400 performs inverse coordinate transformation of the cross sectional configuration DC positioned on the plane 300b designated in the spatial coordinate system 300a so that the configuration DC is returned to the plane coordinate system 100a.

Next, the operation of the cross sectional configuration creation apparatus in the creation of the free curve according to the present invention will be described.

First, the operator creates the cross sectional configuration DC on the plane coordinate system 100a by using the cross sectional configuration creation means 100. The coordinate transformation means 200 positions the thus created cross sectional configuration DC on the plane 300b designated in the spatial coordinate system 300a in response to a command from the operator. Then, the free curve creation means 300 creates a free curve from the cross sectional configuration DC positioned on the plane 300b designated in the spatial coordinate system 300a and the basic curve BC.

The thus created free curve is displayed on a display unit or the like. If the displayed free curve does not satisfy the intention of the operator, the inverse coordinate transformation means 400 returns the cross sectional configuration DC positioned on the plane 300b designated in the spatial coordinate system 300a to the plane coordinate system 100a in response to a command from the operator. With this arrangement, the operator can correct the cross sectional configuration DC by using the cross sectional configuration creation means 100. Then, a free curve is created again by the coordinate transformation means 200 and free curve creation means 300 in response to a command from the operator.

Therefore, since a cross sectional configuration is defined by a predetermined plane coordinate system and the defined cross sectional configuration is subjected to coordinate transformation to the plane of a spatial coordinate system and then a free curve is created, the cross sectional configuration can be easily defined without displaying other line segments such as a basic curve and the like on the display unit. Further, since the cross sectional configuration in the spatial coordinate system is subjected to inverse coordinate transformation to the predetermined original plane coordinate system in response to a command from the operator, the free curve can be easily corrected.

Figure 2:
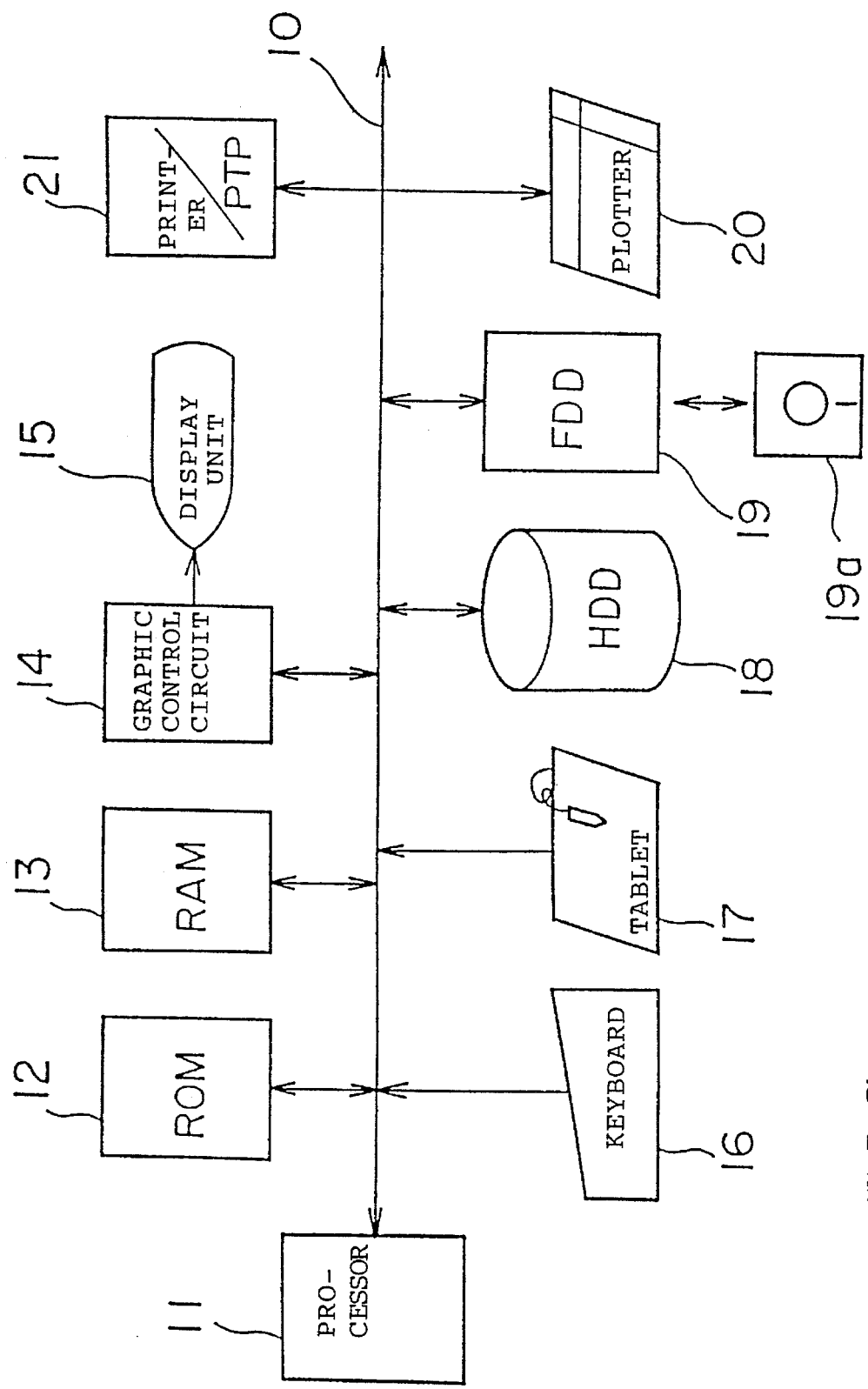
FIG. 2 is a block diagram of the hardware of a CAD/CAM system embodying the present invention.

FIG. 2 is a block diagram of the hardware of a CAD/CAM system embodying the present invention. A processor 11 controls the CAD/CAM system as a whole in accordance with a system program stored in a ROM 12. The ROM 12 stores programs for realizing various kinds of means such as the cross sectional configuration creation means 100, coordinate transformation means 200, free curve creation means 300, inverse coordinate transformation means 400 and the like shown in FIG. 1 in addition to the system program for controlling the CAD/CAM system as a whole. A RAM 13 stores various kinds of data, for example, a configuration information such as a basic curve, drive curve and the like and a system program and the like loaded from a floppy disc 19a.

A graphic control circuit 14 converts data such as NC data, workpiece configuration and the like stored in the RAM 13 into display signals, and supplies these signals to a display unit 15, which displays the NC data, workpiece configuration and the like. A CRT, liquid crystal display or the like is used as the display unit 15.

A keyboard 16 includes operation keys used to input data and software keys whose function is changed by the system program and the like. A tablet 17 is used to input data such as the configuration information and the like.

A hard disc drive (HDD) 18 stores data such as a system information including parameters and the like, the NC data and the like which must be maintained operative even after a power supply to the CAD/CAM system is cut off. A floppy disc drive (FDD) 19 can input the NC data by driving a floppy disc 19a or output corrected NC data to the floppy disc 19a.

Further, a created machining configuration and NC data can be output to a plotter 20 and printer/paper tape puncher (PTP) 21. Note, these components are interconnected through a bus 10.

Next, the cross sectional configuration creation apparatus in the creation of a free curve according to the present invention will be described.

In general, a drive curve constituting a free curve, i.e., a cross sectional configuration can be most easily defined by defining a plane showing the cross section of the free curve on a plane coordinate system (H, V). Further, when the cross sectional configuration is defined, it is preferable to obtain a plane by which the cross sectional configuration can be most easily defined, and is preferable not to impose limitation to obtain the plane.

On the other hand, the plane of a spatial coordinate system (X, Y, Z) can be specified from one point therein and the normal line at the point. Therefore, the cross sectional configuration can be defined in the spatial coordinate system in such a manner that the cross sectional configuration is defined on the plane coordinate system (H, V) and the thus defined cross sectional configuration is subjected to coordination transformation to the plane of the spatial coordinate system.

Next, a method of performing coordinate transformation of the cross sectional configuration defined on the plane in the spatial coordinate system will be described.

When a normal vector (i, j, k) on a plane at one point (x, y, z) on a basic curve defined in the spatial coordinate system is represented by (i, j, k), a parallel movement matrix M1 for moving in parallel the normal vector (i, j, k) to the origin of the spatial coordinate system is defined by the following formula.

$$M1 = \begin{bmatrix} 1 & 0 & 0 & 0 \\ 0 & 1 & 0 & 0 \\ 0 & 0 & 1 & 0 \\ -x & -y & -z & 1 \end{bmatrix} \quad (1)$$

Further, on the contrary, a parallel movement matrix M2 for moving in parallel the normal vector (i, j, k) located at the origin of the basic curve to the one point (x, y, z) on the basic curve is defined by the following formula.

$$M2 = \begin{bmatrix} 1 & 0 & 0 & 0 \\ 0 & 1 & 0 & 0 \\ 0 & 0 & 1 & 0 \\ X & Y & Z & 1 \end{bmatrix} \quad (2)$$

Figure 3:
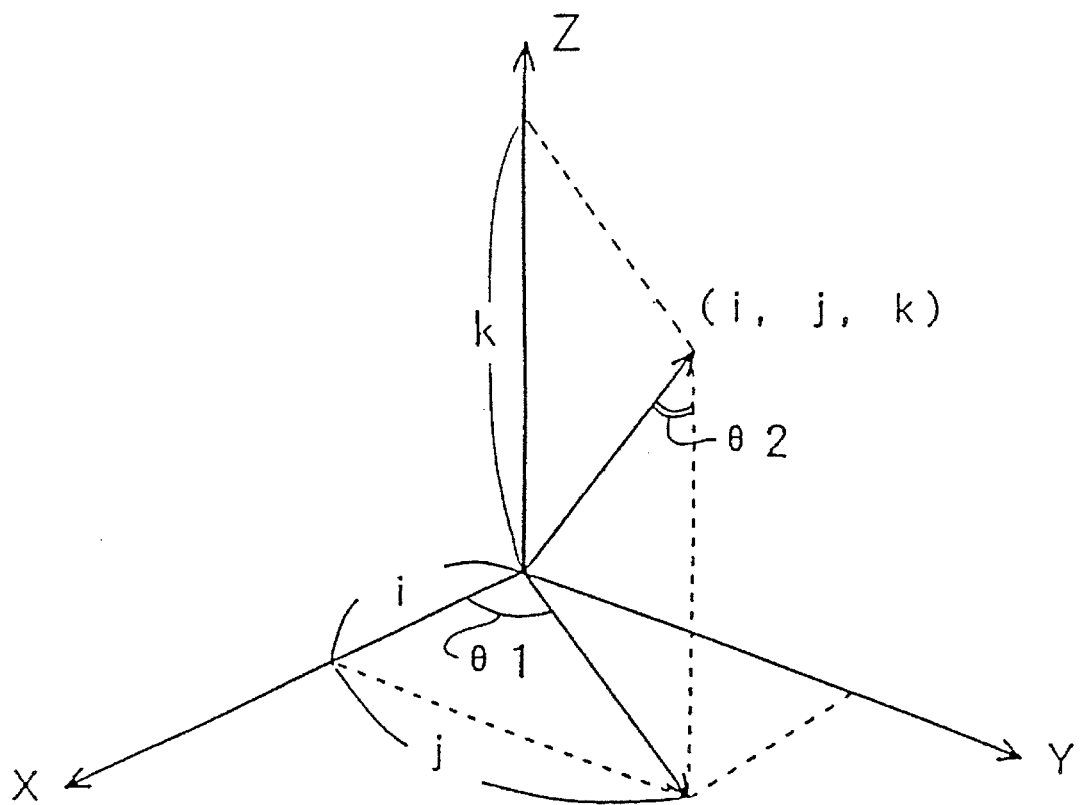
FIG. 3 is a diagram showing the normal vector at the origin of a spatial coordinate system.

FIG. 3 is a diagram showing the normal vector at the origin of the spatial coordinate system, wherein the normal vector (i, j, k) is defined at the origin of the spatial coordinate system (X, Y, Z). The angle between a line segment obtained by projecting the normal vector (i, j, k) onto an XY plane and an X-axis is represented by $\theta 1$. In the same way, the angle between the normal vector (i, j, k) and a Z-axis is represented by $\theta 2$. At this time, the angles $\theta 1$ and $\theta 2$ are defined by the following formulas.

$$\theta 1 = \tan^{-1}(j/i) \quad (3)$$

$$\theta 2 = \tan^{-1}(\sqrt{i^2 + j^2}/k) \quad (4)$$

Then, a plane transformation matrix M3 for transforming the plane of a normal vector (0, 0, 1), i.e., the XY plane in the spatial coordinate system (X, Y, Z) to the plane of the normal vector (i, j, k) is defined by the following formula from the above formulas (3) and (4).

$$M3 = \begin{bmatrix} -\sin(\theta 1) & \cos(\theta 1) & 0 & 0 \\ -\cos(\theta 1) & -\sin(\theta 1) & 0 & 0 \\ 0 & 0 & 1 & 0 \\ 0 & 0 & 0 & 1 \end{bmatrix} \cdot \quad (5)$$

$$\begin{bmatrix} 1 & 0 & 0 & 0 \\ 0 & \cos(\theta 2) & \sin(\theta 2) & 0 \\ 0 & -\sin(\theta 2) & \cos(\theta 2) & 0 \\ 0 & 0 & 0 & 0 \end{bmatrix}$$

Further, a coordinate transformation matrix M can be determined by the following formula from the above formulas (1), (2) and (5).

$$M = M1 \cdot M3 \cdot M2 \quad (6)$$

The thus obtained coordinate transformation matrix M is used to move in parallel the one point (x, y, z) on the basic curve defined in the spatial coordinate system (X, Y, Z) to the origin, perform coordinate transformation of the cross sectional configuration defined on the plane coordinate system (H, V) to the plane moved to the origin and further move in parallel the cross sectional configuration having been subjected to the coordinate transformation to the one point (x, y, z).

Here, a cross sectional configuration whose cross section is composed of the plane at the one point (x, y, z) on the basic curve defined in the spatial coordinate system (X, Y, Z) can be defined by defining the cross sectional configuration in the plane coordinate system (H, V) and multiplying the above coordination transformation matrix M by the cross sectional configuration. More specifically, when a point on the cross sectional configuration defined on the plane coordinate system (H, V) is represented by [h, v, 0], the position of the cross sectional configuration in the spatial coordinate system (X, Y, Z) can be specified by calculating the following formula (7).

$$(x, y, z) = [h, v, 0] \cdot M \qquad (7)$$

Conversely, when a point on the cross sectional configuration in the spatial coordinate system (X, Y, Z) is represented by (x, y, z) and the cross sectional configuration is subjected to inverse coordinate transformation to the plane coordinate system (H, V), the point [h, v, 0] on the plane coordinate system (H, V) can be determined by calculating the following formula (8).

$$[h, v, 0] = (x, y, z) \cdot M^{-1} \qquad (8)$$

Next, a method of positioning the plane coordinate system to the spatial coordinate system will be described. Respective cross sectional configurations are assumed to be created by the cross sectional configuration creation means 100 shown in FIG. 1.

First, a first embodiment will be described.

Figure 4:
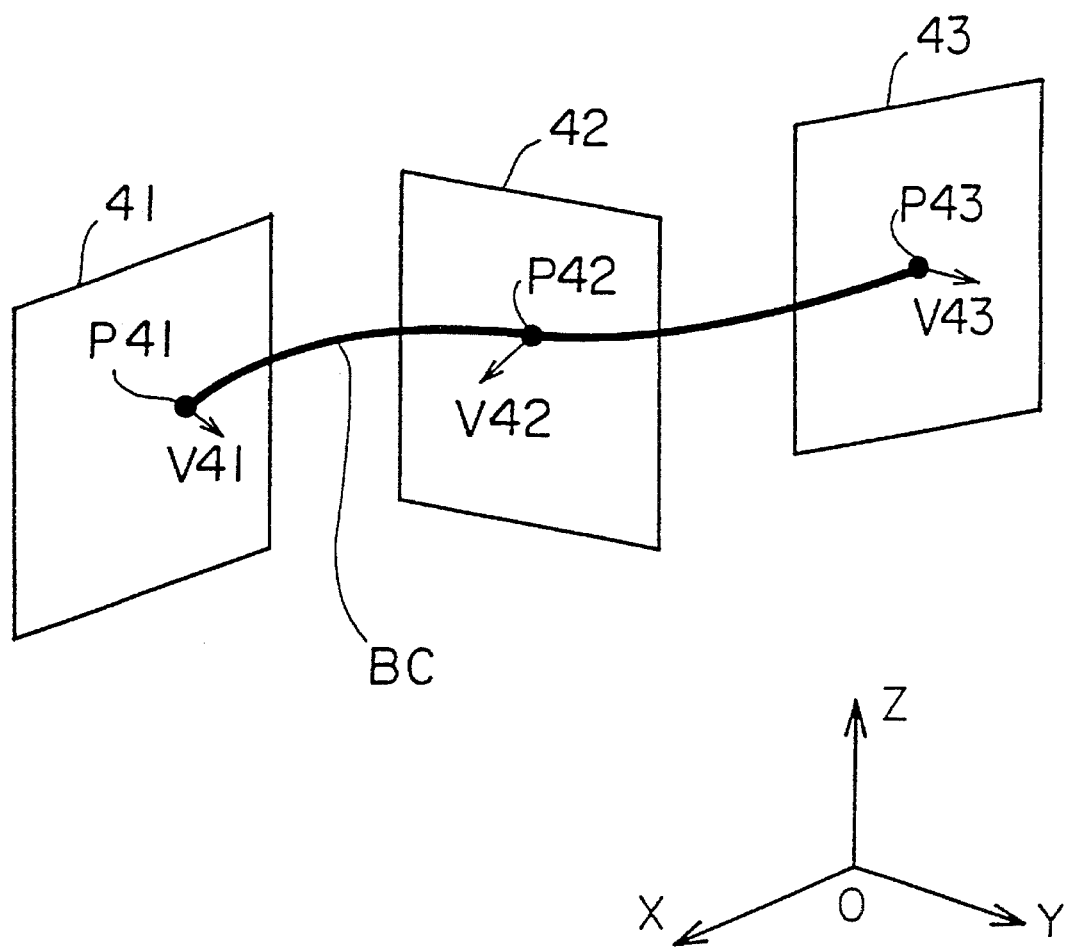
FIG. 4 is a diagram of planes when arbitrary linear vectors at passing-through points on a basic curve are normal vectors on the planes.

FIG. 4 is a diagram of planes when arbitrary linear vectors at passing-through points on a basic curve are normal vectors on the planes, wherein a basic curve BC is predefined in the spatial coordinate system (X, Y, Z) and passing-through points P41, P42, P43 designated by an operator are shown on the basic curve BC. Note, the passing-through points P41, P42, P43 are arbitrarily set on the basic curve BC.

Next, the operator designates normal vectors at the passing-through points P41, P42, P43 by using the keyboard 16 or the like shown in FIG. 2. FIG. 4 shows that a normal vector V41 is designated at the passing-through point P41, a normal vector V42 is designated at the passing-through point P42, and a normal vector V43 is designated at the passing-through point P43, respectively, on the basic curve BC.

With this arrangement, a plane 41 is specified and positioned by the passing-through point P41 and normal vector V41. In the same way, a plane 42 is specified and positioned by the passing-through point P42 and normal vector V42, and a plane 43 is specified and positioned by the passing-through point P43 and normal vector V43.

Figure 5:
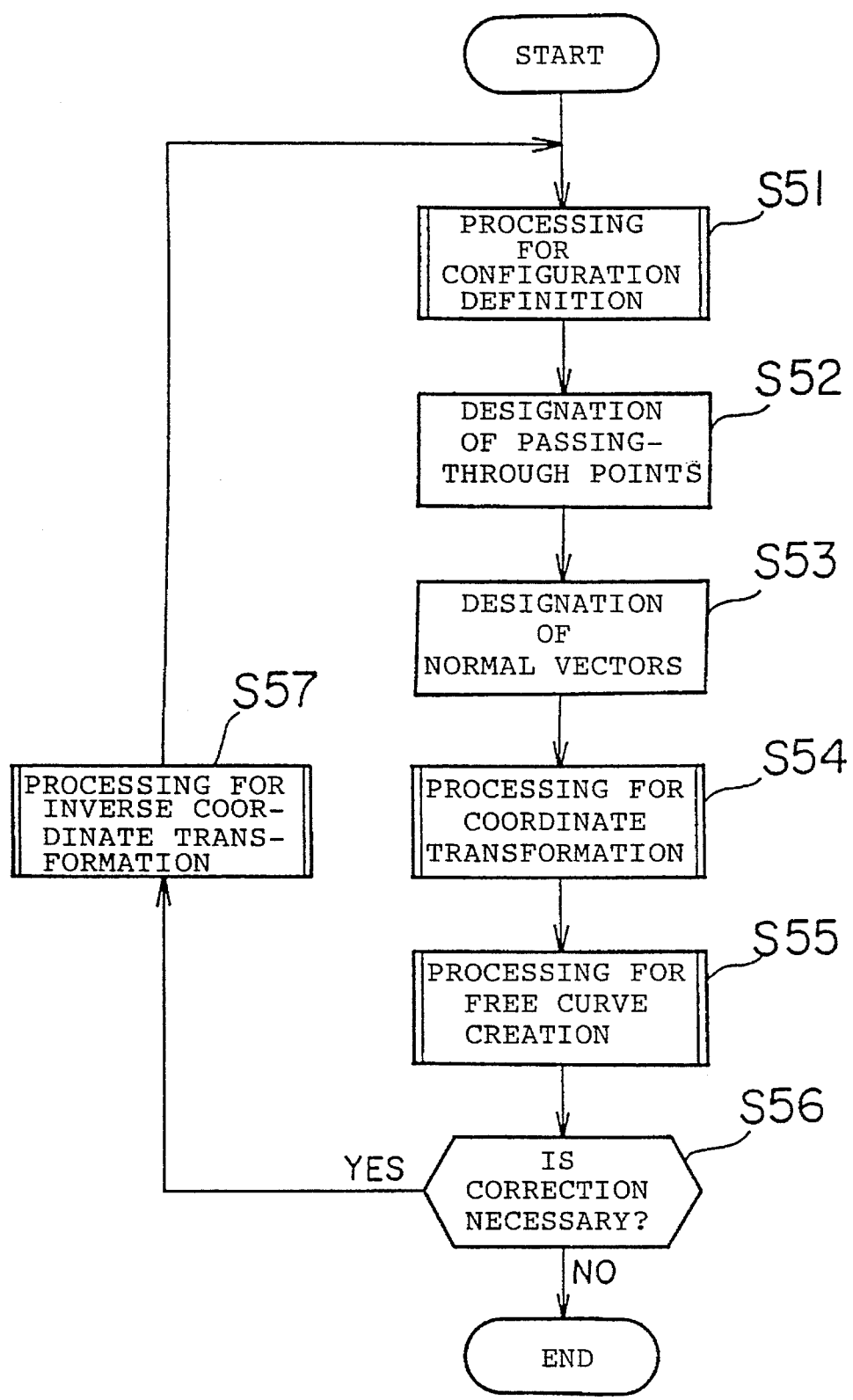
FIG. 5 is a flowchart showing a processing sequence for creating a free curve from the basic curve and the cross sectional configurations on the respective planes shown in FIG. 4.

FIG. 5 is a flowchart showing a processing sequence for creating a free curve from the basic curve and the cross sectional configurations on the respective planes shown in FIG. 4. This flowchart is realized by the processor 11 executing the processing program stored in the ROM 12 shown in FIG. 2. Note, the basic curve is assumed to be predefined. In FIG. 5, numerals prefixed with an "S" indicate the number of steps.

[S51] A configuration definition processing is executed. More specifically, the operator creates a cross sectional configuration serving as a drive curve by the cross sectional configuration creation means 100 shown in FIG. 1.

[S52] The passing-through points are designated. That is, the operator designates arbitrary points on the predefined basic curve by using the keyboard 16 or the like shown in FIG. 2. Note, although FIG. 4 shows a case in which the three points are designated, the number of the passing-through points may be arbitrarily determined as required.

[S53] The normal vectors are designated. That is, the operator designates the normal vectors at the respective passing-through points by using the keyboard 16 or the like shown in FIG. 2 in the same way as the passing-through points are designated at step S52.

[S54] A coordinate transformation processing is executed. More specifically, the coordinate values [h, v, 0] of the cross sectional configuration on the plane coordinate system defined at step S51 is transformed to the coordinate value (x, y, z) of the spatial coordinate system in response to a command from the operator by the coordinate transformation means 200 shown in FIG. 1. That is, the above formulas (1)–(7) are calculated.

[S55] The free curve is created. More specifically, the free curve is created by the free curve creation means 300 shown in FIG. 1 from the predefined basic curve and the cross sectional configuration positioned in the spatial coordinate system at step S54. The thus created free curve is drawn and displayed on the display unit 15 shown in FIG. 2.

[S56] It is determined by the operator whether or not the free curve drawn and displayed at step S55 is to be corrected. If it is to be corrected (YES), the flow goes to step S57, and if not (NO), the processing sequence is finished.

[S57] Inverse coordinate transformation is executed. More specifically, the coordinate values (x, y, z) of the cross sectional configuration in the spatial coordinate system positioned at step S54 is subjected to the inverse coordinate transformation to the coordinate values [h, v, 0] on the plane coordinate system by the inverse coordinate transformation means 400 shown in FIG. 1 in response to a command from the operator. That is, the above formula (8) is calculated.

Next, a second embodiment will be described.

Figure 6:
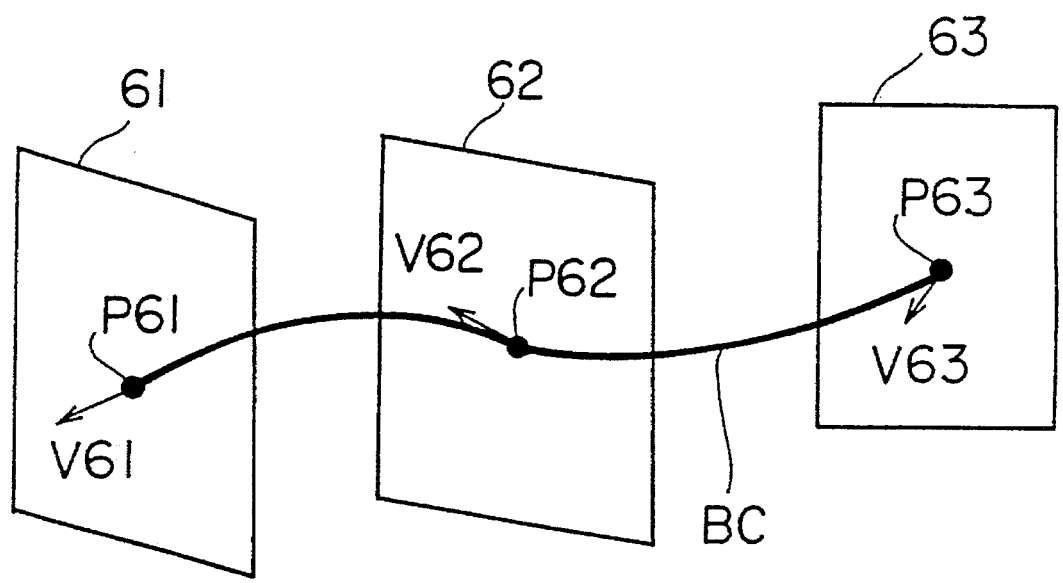
FIG. 6 is a diagram showing planes when tangential vectors on a basic curve at passing-through points thereon are normal vectors on the planes.
Figure 6:
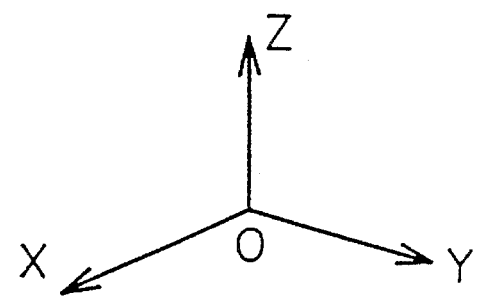

FIG. 6 is a diagram showing planes when tangential vectors on a basic curve at passing-through points thereon are normal vectors on the planes. In FIG. 6, a basic curve BC is predefined in a spatial coordinate system (X, Y, Z) and passing-through points P61, P62, P63 designated by the operator are shown on the basic curve BC. Note, the passing-through points P61, P62, P63 are arbitrarily set on the basic curve BC.

Note, FIG. 6 is different from FIG. 4 in that the operator arbitrarily designates the normal lines at the respective passing-through points in FIG. 4, whereas the tangential vectors on the basic curve BC at the passing-through points P61, P62, P63 are calculated as the normal vectors in FIG. 6. In the figure, the calculated normal vector V61 is shown at the passing-through point P61, the calculated normal vector V62 is shown at the passing-through point P62, and the calculated normal vector V63 is shown at the passing-through point P63, respectively, on the basic curve BC.

With this arrangement, a plane 61 is specified and positioned by the passing-through point P61 and normal vector V61. In the same way, a plane 62 is specified and positioned by the passing-through point P62 and normal vector V62, and a plane 63 is specified and positioned by the passing-through point P63 and normal vector V63.

Figure 7:
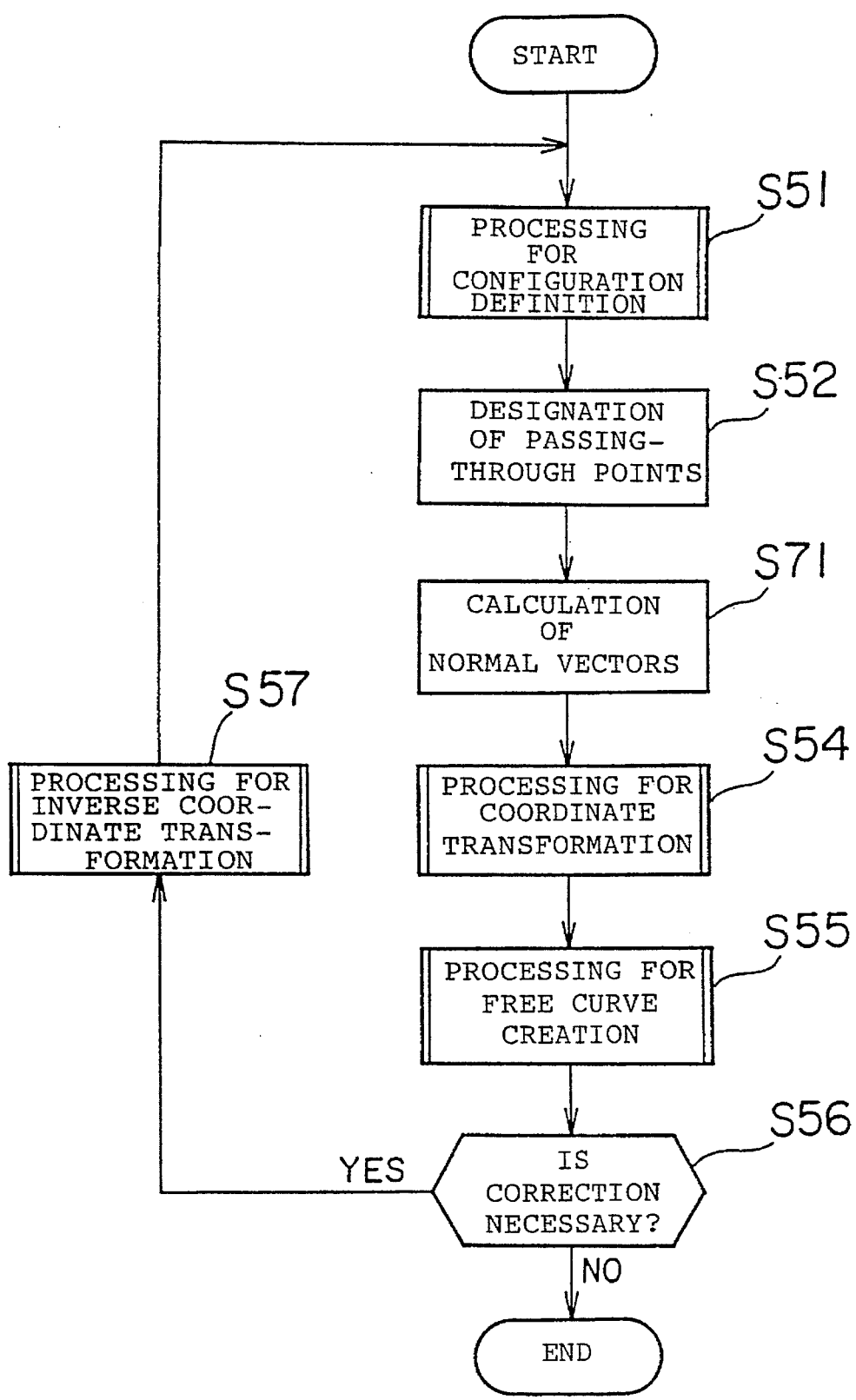
FIG. 7 is a flowchart showing a processing sequence for creating a free curve from the basic curve and the cross sectional configurations on the respective planes shown in FIG. 6.

FIG. 7 is a flowchart showing a processing sequence for creating a free curve from the basic curve and the cross sectional configurations on the respective planes shown in FIG. 6. Note, the same numerals as used in FIG. 5 are used to designate the same elements in FIG. 7 and the description thereof is omitted. Further, the basic curve is assumed to be predefined.

[S71] The normal vectors are calculated. That is, the tangential vectors of the basic curve at the respective passing-through points designated at step S52 are calculated and used as the normal vectors on the plane.

Next, a third embodiment will be described.

Figure 8:
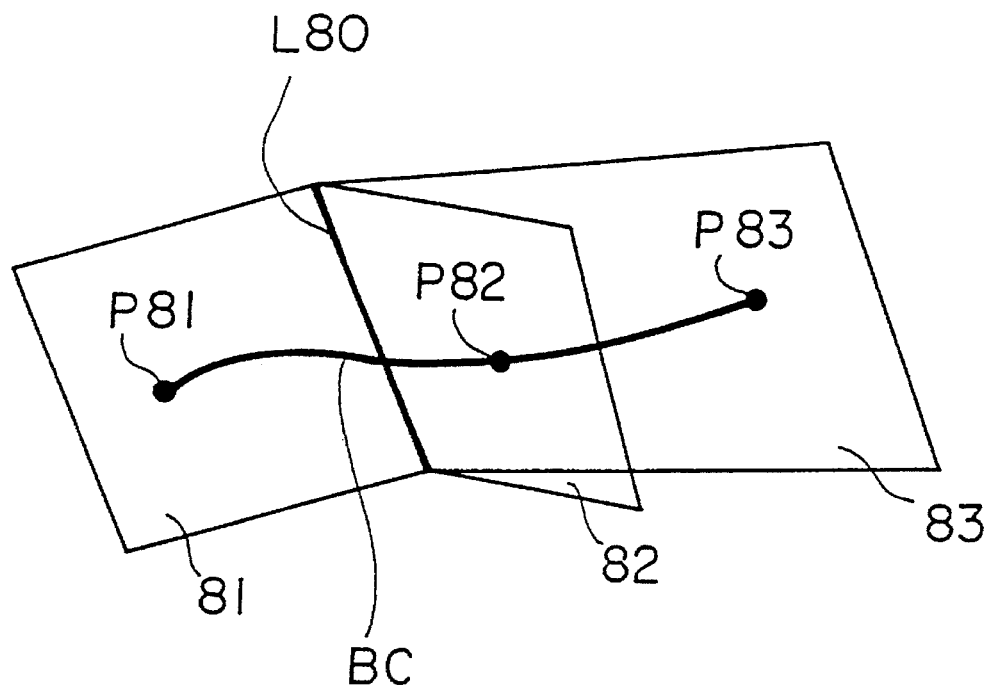
FIG. 8 is a diagram showing planes containing passing-through points on a basic curve and a straight line used as the axis of at least one plane.

FIG. 8 is a diagram showing planes containing passing-through points on a basic curve and a straight line used as the axis of at least one plane. In FIG. 8, a basic curve BC is predefined in a spatial coordinate system (X, Y, Z) and passing-through points P81, P82, P83 designated by the operator are shown on the basic curve BC. Note, the passing-through points P81, P82, P83 are arbitrarily set on the basic curve BC.

Thereafter, the operator designates a straight line L80 serving as a central axis. With this arrangement, a plane 81 is specified and positioned by the passing-through point P81 and straight line L80. In the same way, a plane 82 is specified and positioned by the passing-through point P82 and straight line L80, and a plane 83 is specified and positioned by the passing-through point P83 and straight line L80.

More specifically, when a directional vector on the straight line L80 is represented by (a, b, c) and the coordinate values on a point on the straight line L80 are represented by (x1, y1, z1), the straight line L80 is represented by the following formula.

$$\begin{bmatrix} x \\ y \\ z \end{bmatrix} = \begin{bmatrix} x1 \\ y1 \\ z1 \end{bmatrix} + t \cdot \begin{bmatrix} a \\ b \\ c \end{bmatrix} \tag{9}$$

Therefore, a point on the straight line L80 is determined by changing the parameter t of the above formula (9). Further, two arbitrary points are determined on the straight line L80 and the directional vectors from the passing-through point P81 to these two points are determined. Then, the normal vector at the passing-through point P81 is determined by determining an outer product from the thus determined two directional vectors. In the same way, the normal vector at each of the passing-through points P82 and P83 is determined by determining directional vectors to two arbitrary points on the straight lines L80 and determining the outer product from the two determined directional vectors.

Figure 9:
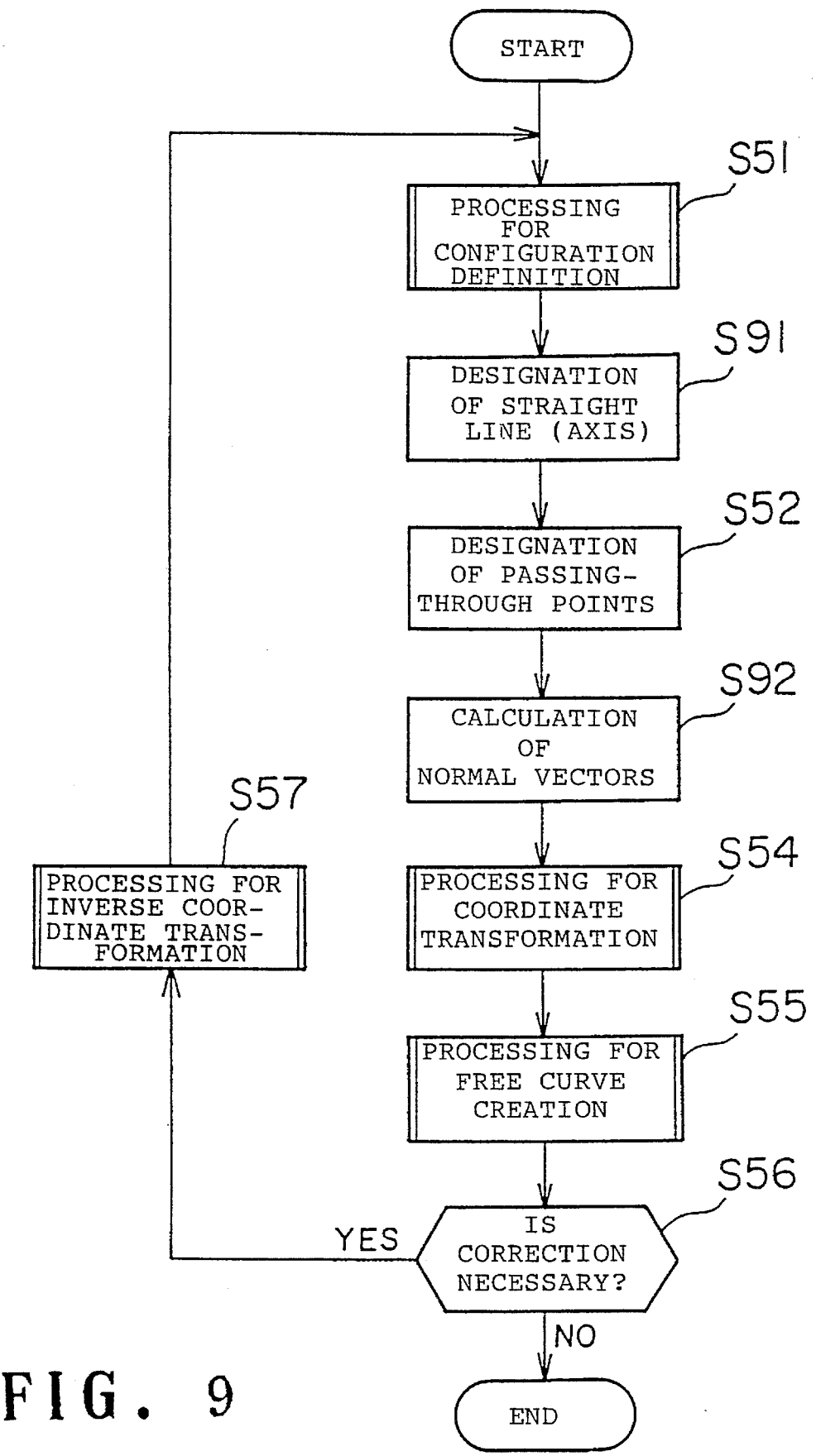
FIG. 9 is a flowchart showing a processing sequence for creating a free curve from the basic curve and the cross sectional configurations on the respective planes shown in FIG. 8.

FIG. 9 is a flowchart showing a processing sequence for creating a free curve from the basic curve and the cross sectional configurations on the respective planes shown in FIG. 8. In FIG. 9, numerals prefixed with an "S" indicate the number of steps.

[S91] The straight line (axis) is designated. That is, the operator designates the straight line serving as a center axis by using the keyboard 16 or the like shown in FIG. 2.

[S92] The normal vectors are calculated. That is, the directional vectors from the passing-through point to the two points on the straight line L80 designated at step S91 are determined based on the two points and passing-through point and the outer product is determined from these two directional vectors to calculate the normal vectors.

Next a fourth embodiment will be described.

Figure 10:
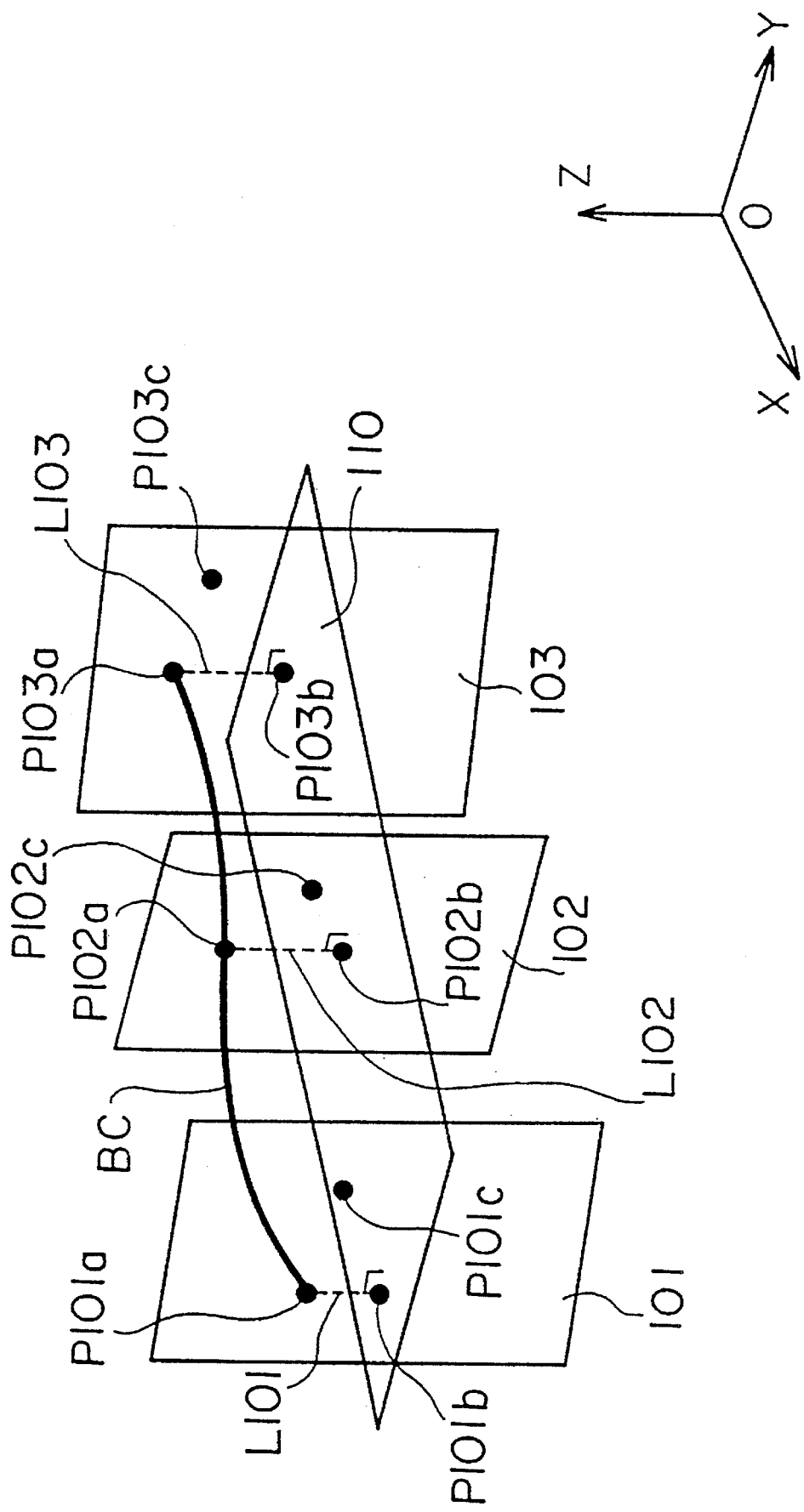
FIG. 10 is a diagram showing passing-through points on a basic curve, the intersecting points of vertical lines dropped from the passing-through points on the basic curve with another arbitrary plane, and planes each containing one arbitrary point.

FIG. 10 is a diagram showing passing-through points on a basic curve, the intersecting points of vertical lines dropped from the passing-through points on the basic curve with another arbitrary plane, and planes each containing one arbitrary point. In FIG. 10, a basic curve BC is predefined in a spatial coordinate system (X, Y, Z) and passing-through points P101a, P102a, P103a designated by the operator are shown on the basic curve BC. Note, the passing-through points P101a, P102a, P103a are arbitrarily set on the basic curve BC.

Thereafter, the operator designates another plane 110 and one arbitrary point corresponding to each of the passing-through points. With this arrangement, the vertical line L101 dropped from the passing-through point P101a onto another plane 110 and the intersecting point P101b of the vertical line with another plane 110 are determined. Then, a plane 101 is specified and positioned by the passing-through point P101a, intersecting point P101b and one arbitrary point P101c designated in correspondence with the passing-through point P101a. In the same way, a plane 102 is specified and positioned by the passing-through point P102a, intersecting point P102b and one arbitrary point P102c, and a plane 103 is specified and positioned by the passing-through point P103a, intersecting point P103b and one arbitrary point P103c.

The intersecting point P101b determined from the vertical line L101 dropped from the passing-through point P101a onto another plane 110 with another plane 110 is calculated as follows. Here, the coordinate values of the passing-through point P101a are represented by (x1, y1, z1) and the coordinate values of the intersecting point P101b is represented by (x2, y2, z2).

First, when a normal vector on another plane 110 is represented by (a, b, c), the following formula is obtained.

$$ax+by+cz=d \tag{10}$$

The vertical line L101 dropped from the passing-through point P101a onto another plane 110 is represented by the formula of a straight line passing through the passing-through point P101a and having the normal vector (a, b, c) as a directional vector. Therefore, the following relationship is established from the formula (9).

$$x2=x1+ta, \ y2=y1+ta, \ z2=z1+ta \tag{11}$$

Here, since the intersecting point P101b is the point where the above straight line intersects with another plane 110, when t is determined by substituting the formula of the straight line (11) for the formula of the plane (10), the following formula is obtained.

$$t=\{d-(a.x1+b.y1+c.z1)\}.(a^2+b^2+c^2) \tag{12}$$

Then, when the value of t is substituted for the formula of the straight line (11), the coordinate values of the intersecting point P101b is determined.

Further, the normal vector on the plane 101 is determined by determining the outer product of the directional vector from the passing-through point P101a to the intersecting point P101b and the directional vector from the passing-through point P101a to the one arbitrary point P101c.

Figure 11:
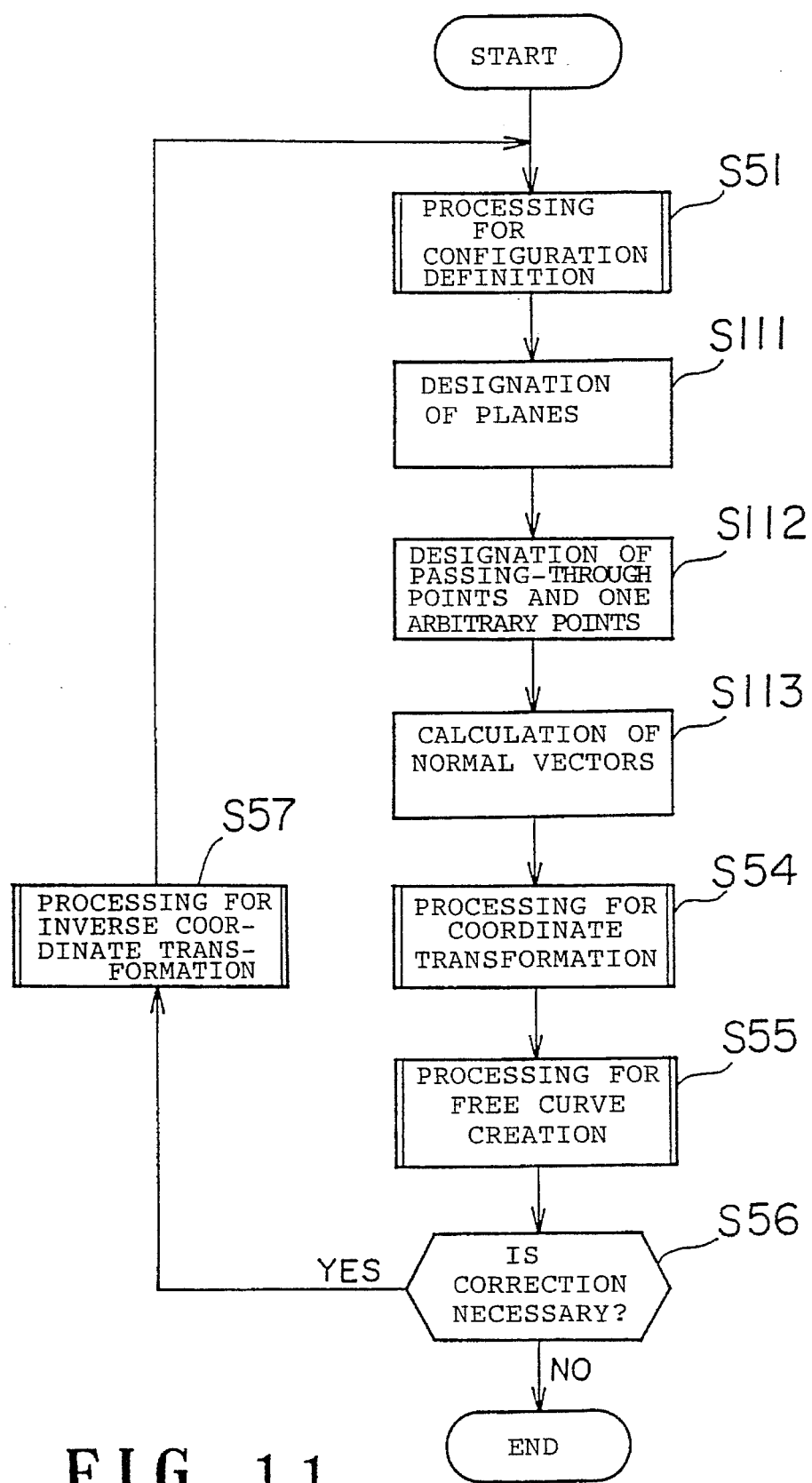
FIG. 11 is a flowchart showing a processing sequence for creating a free curve from the basic curve and the cross sectional configurations on the respective planes shown in FIG. 10.

FIG. 11 is a flowchart showing a processing sequence for creating a free curve from the basic curve and the cross sectional configurations on respective planes shown in FIG. 10. In FIG. 11, numerals prefixed with an "S" indicate the number of steps.

[S111] Another plane is designated. That is, the operator designates an arbitrary plane in the spatial coordinate system by using the keyboard 16 or the like shown in FIG. 2.

[S112] The operator designates the passing-through points and the one arbitrary points corresponding to each of the passing-through points. That is, the arbitrary points on the predefined basic curve and the one arbitrary points in the spatial coordinate system are designated in the same way as step S111.

[S113] The normal vectors are calculated. That is, the intersecting points of the vertical lines dropped from the passing-through points designated at step S112 onto another plane with another plane designated at step S111 are determined. Then, the directional vector from each of the passing-through points to each of the intersecting points and to each of the one arbitrary points is determined based on the passing-through points, intersecting points and one arbitrary points, and the outer product is determined from these two directional vectors to calculate the normal vector.

Next, a fifth embodiment will be described.

Figure 12:
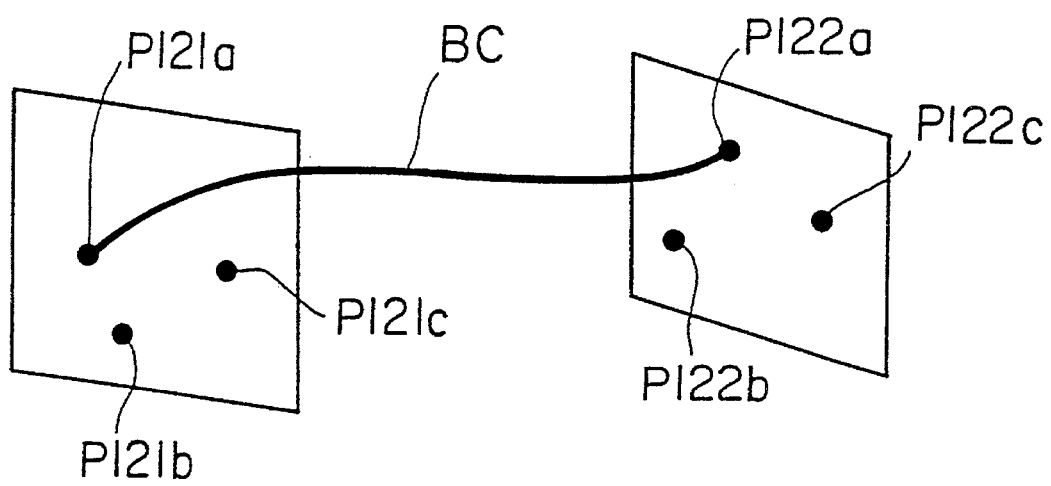
FIG. 12 is a diagram showing planes each containing a passing-through point on a basic curve and two arbitrary coordinate points.
Figure 12:
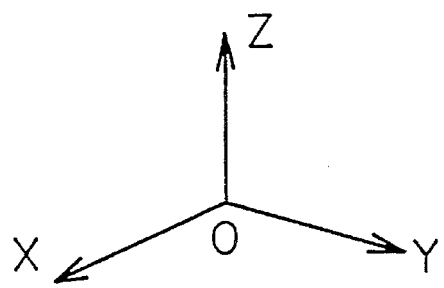

FIG. 12 is a diagram showing planes each containing a passing-through point on a basic curve and two arbitrary coordinate points. In FIG. 12, a basic curve BC is predefined in a spatial coordinate system (X, Y, Z) and passing-through points P121a, P122a designated by the operator are shown on the basic curve BC. Note, the passing-through points P121a, P122a are arbitrarily set on the basic curve BC.

Thereafter, the operator designates two arbitrary coordinate points P121b, P121c. With this arrangement, the directional vector from the passing-through point P121a to one of the arbitrary coordinate points P121b and the directional vector from the passing-through point P121a to the other arbitrary coordinate point P121c are determined. Then, a normal vector is determined by determining an outer product from these two directional vectors. In the same way, a plane 122 is specified and positioned by the passing-through point P122a, one of the arbitrary coordinate point P122b and the other arbitrary coordinate point P122c.

Figure 13:
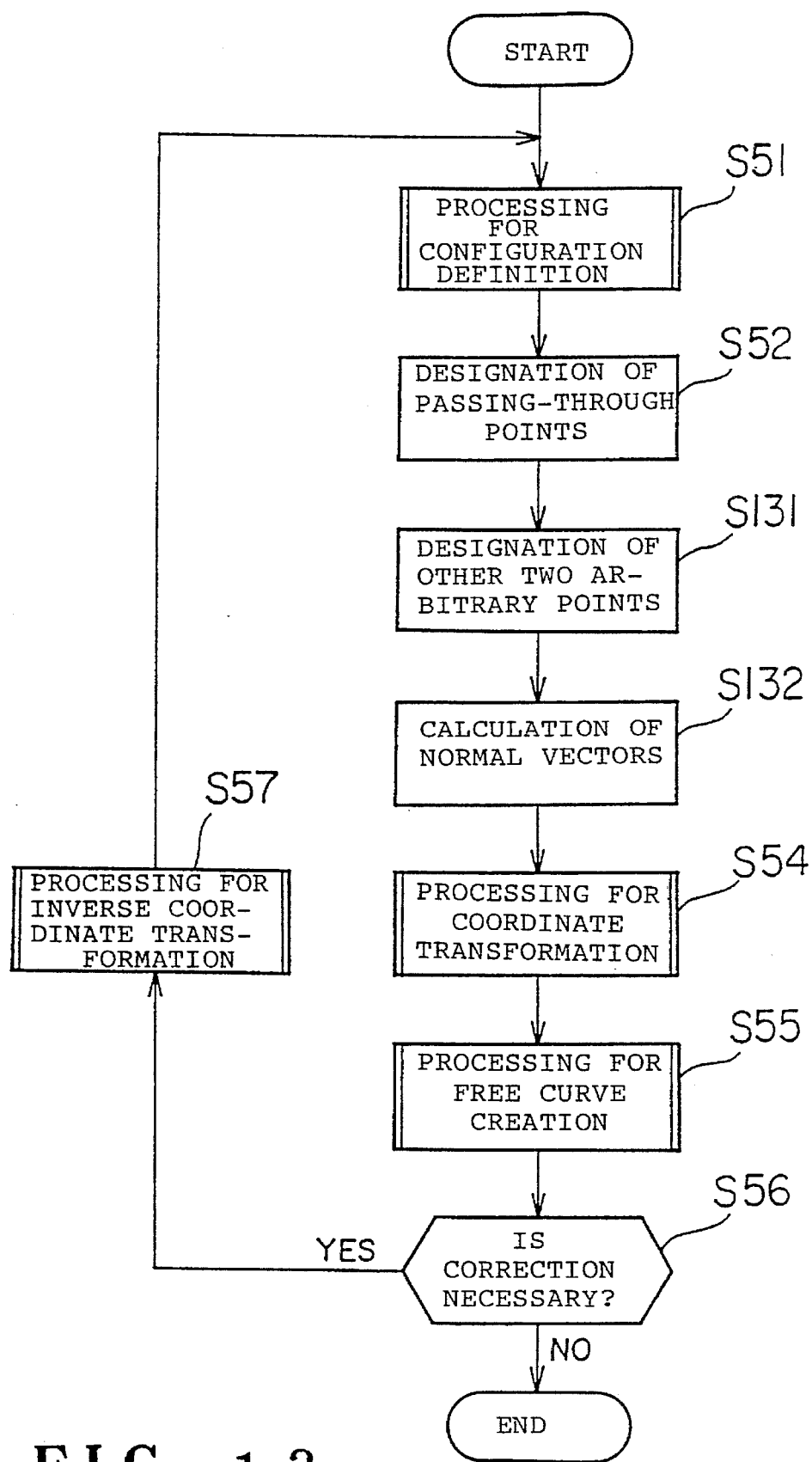
FIG. 13 is a flowchart showing a processing sequence for creating a free curve from the basic curve and the cross sectional configurations on the respective planes shown in FIG. 12.
Figure 14:
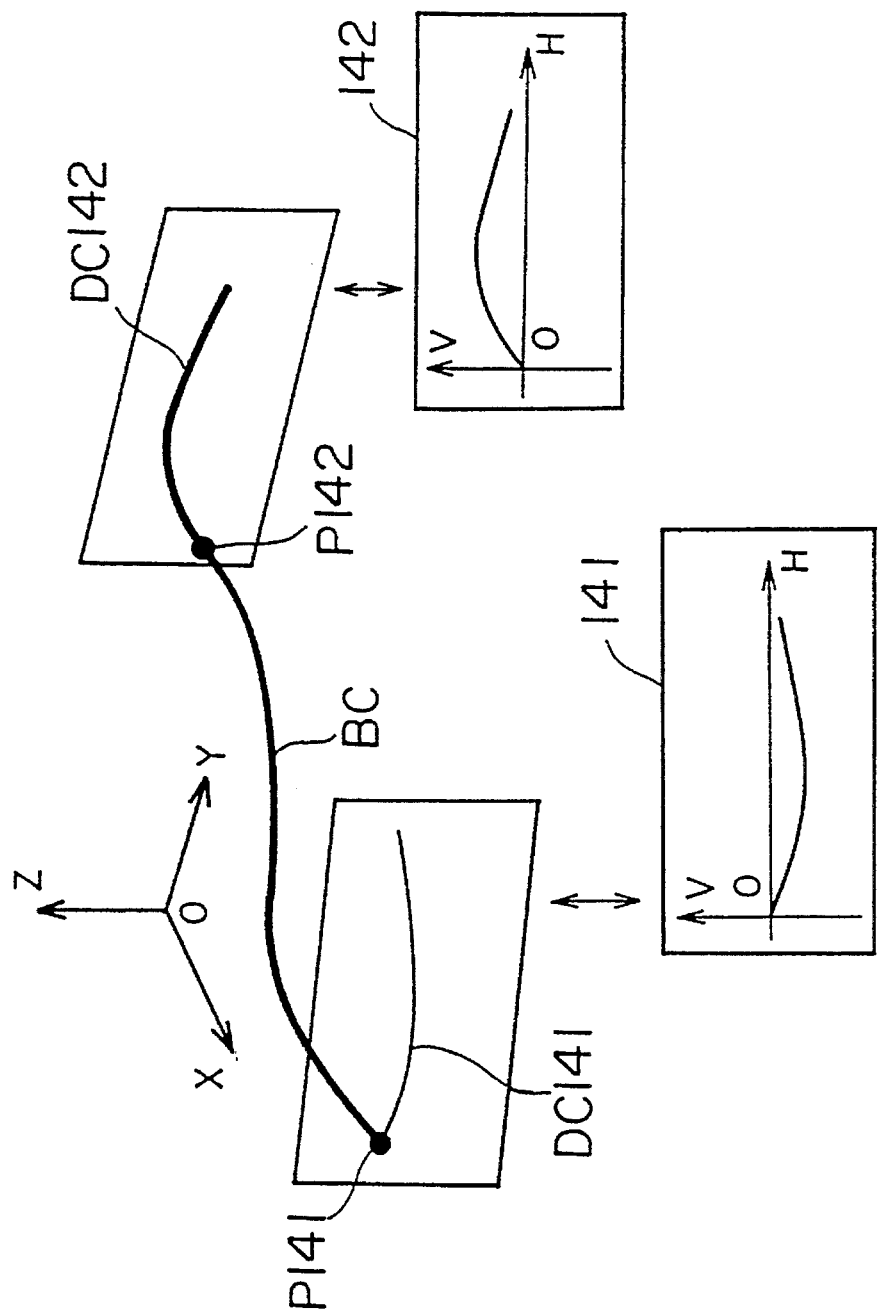
FIG. 14 is a diagram showing the relationship between a basic curve and a drive curve.
Figure 15A:
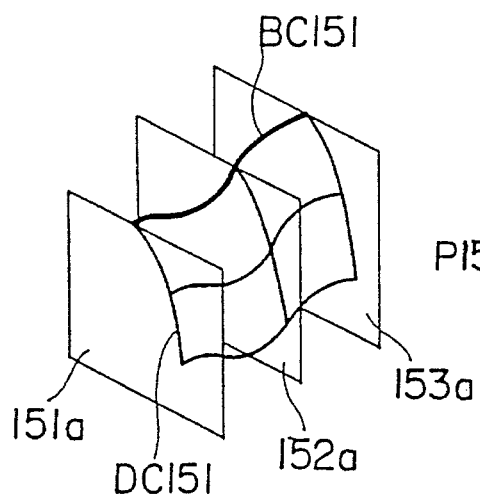
FIGS. 15(a), 15(b), 15(c) and 15(d) are diagrams showing methods of defining a cross sectional configuration with respect to a basic curve.
Figure 15B:
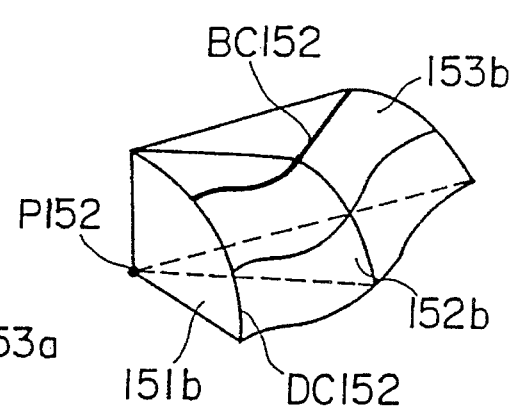
Figure 15C:
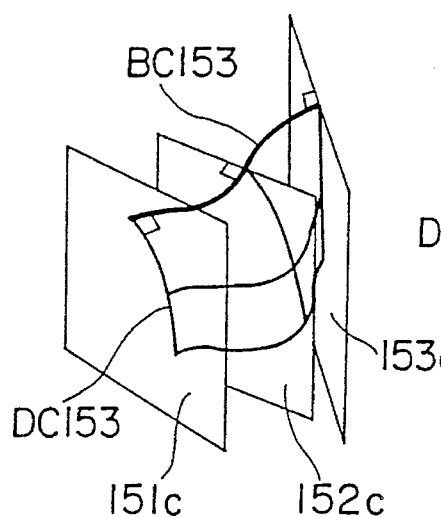
Figure 15D:
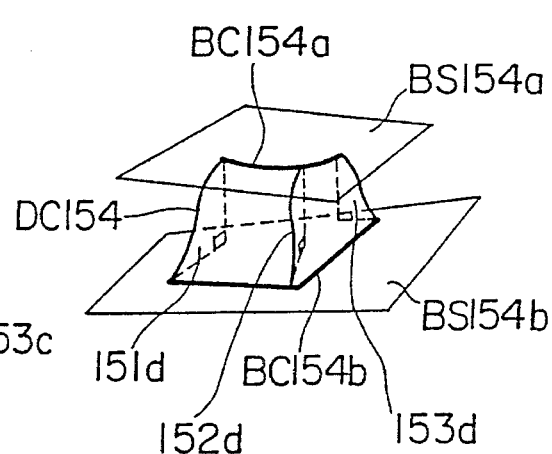

FIG. 13 is a flowchart showing a processing sequence for creating a free curve from a basic curve and the cross sectional configurations on the respective planes shown in FIG. 12. In FIG. 13, numerals prefixed with an "S" indicate the number of steps.

[S131] The two arbitrary coordinate points are designated. That is, the operator designates arbitrary points in the spatial coordinate system by using the keyboard 16 or the like shown in FIG. 2.

[S132] The normal vector is calculated. That is, the normal vector is calculated in such a manner that the directional vectors from each of the passing-through points designated at step S51 to the two arbitrary coordinate points designated at step S131 are determined based on the passing-through points and two arbitrary coordinate points and the outer product is determined from these two directional vectors to calculate the normal vector.

Although the keyboard 16 or the like shown in FIG. 2 is used to input graphic elements such as coordinate points, straight lines and planes in the above description, they may be input by using a pointing device such as a mouse or the like through a command key referred to as "icon" displayed on the display unit 15.

As described above, according to the present invention, since a cross sectional configuration as a drive line is created on a predetermined plane coordinate system by using the cross sectional configuration creation means, a free curve is created from the thus created cross sectional configuration by using the coordinate transformation means and free curve creation means, and the inverse coordinate transformation means returns the cross sectional configuration positioned on the plane designated in a spatial coordinate system to the plane coordinate system, if necessary, the cross sectional configuration creation means can create the cross sectional configuration without other line segments such as a basic curve and the like displayed on the display unit. As a result, when the cross sectional configuration is created, a faulty definition can be prevented.

We claim:

1. A cross sectional configuration creating apparatus in the creation of a free curve for creating a cross sectional configuration to create the free curve by a CAD/CAM system, comprising:

cross sectional configuration creation means for creating said cross sectional configuration on a predetermined plane coordinate system;

coordinate transformation means for performing a coordinate transformation of said cross sectional configuration created on said predetermined plane coordinate system to position said cross sectional configuration on a plane in a spatial coordinate system; and free curve creation means for creating said free curve from said cross sectional configuration positioned on the plane in said spatial coordinate system and a basic curve defined in said spatial coordinate system.

2. A cross sectional configuration creating apparatus in the creation of a free curve according to claim 1, wherein said coordinate transformation means performs said coordinate transformation of said cross sectional configuration created on said plane coordinate system to a plane including passing-through points on said basic curve defined in said spatial coordinate system and arbitrary linear vectors as the normal vectors at said passing-through points.

3. A cross sectional configuration creating apparatus in the creation of a free curve according to claim 2, wherein said arbitrary linear vectors are tangential vectors on said basic curve.

4. A cross sectional configuration creating apparatus in the creation of a free curve according to claim 1, wherein said coordinate transformation means performs said coordinate transformation of said cross sectional configuration created on said plane coordinate system to a plane including passing-through points on the basic curve defined in said spatial coordinate system and a straight line used as the axis of at least one plane and defined in said spatial coordinate system.

5. A cross sectional configuration creating apparatus in the creation of a free curve according to claim 1, wherein said coordinate transformation means performs said coordinate transformation of said cross sectional configuration created on said plane coordinate system to a plane including passing-through points on the basic curve defined in said spatial coordinate system, another arbitrary plane defined in said spatial coordinate system, intersecting points of vertical lines dropped from said passing-through points with said another plane and a plurality of arbitrary points defined in said spatial coordinate system.

6. A cross sectional configuration creating apparatus in the creation of a free curve according to claim 1, wherein said coordinate transformation means performs said coordinate transformation of said cross sectional configuration created on said plane coordinate system to a plane including passing-through points on the basic curve defined in said spatial coordinate system and two arbitrary coordinate points defined in said spatial coordinate system.

7. A cross sectional configuration creating apparatus for creating a cross sectional configuration to create a free curve, comprising:

cross sectional configuration creation means for creating said cross sectional configuration on a predetermined plane coordinate system;

coordinate transformation means for performing a coordinate transformation of said cross sectional configuration created on said predetermined plane coordinate system to position said cross sectional configuration on a plane in a spatial coordinate system;

free curve creation means for creating said free curve from said cross sectional configuration positioned on the plane in said spatial coordinate system and a basic curve defined in said spatial coordinate system; and inverse coordinate transformation means for performing an inverse coordinate transformation of said cross sectional configuration positioned on the plane of said spatial coordinate system to return said cross sectional configuration to said predetermined plane coordinate system.

* * * * *

UNITED STATES PATENT AND TRADEMARK OFFICE
CERTIFICATE OF CORRECTION

PATENT NO. : 5,467,445

DATED : November 14, 1995

INVENTOR(S) : Masaki SEKI et al.

It is certified that error appears in the above-indentified patent and that said Letters Patent is hereby corrected as shown below:

On the title page, item

[30] Foreign Application Priority Data, "Apr. 7, 1993" should be --Apr. 14, 1992--.

Column 6, in Formula 5, line 54, last occurrence, delete "0" and insert --1-- therein.

Signed and Sealed this

Fifth Day of March, 1996

Attest:

BRUCE LEHMAN

Attesting Officer

Commissioner of Patents and Trademarks